H. MARANVILLE.
Coin Detector.
No. 27,140.
Patented Feb 14, 1860.
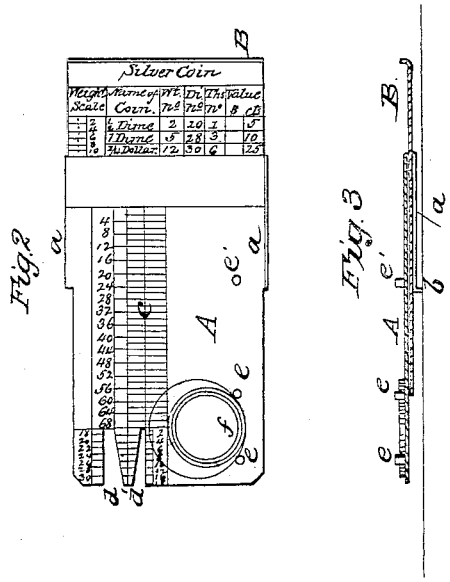
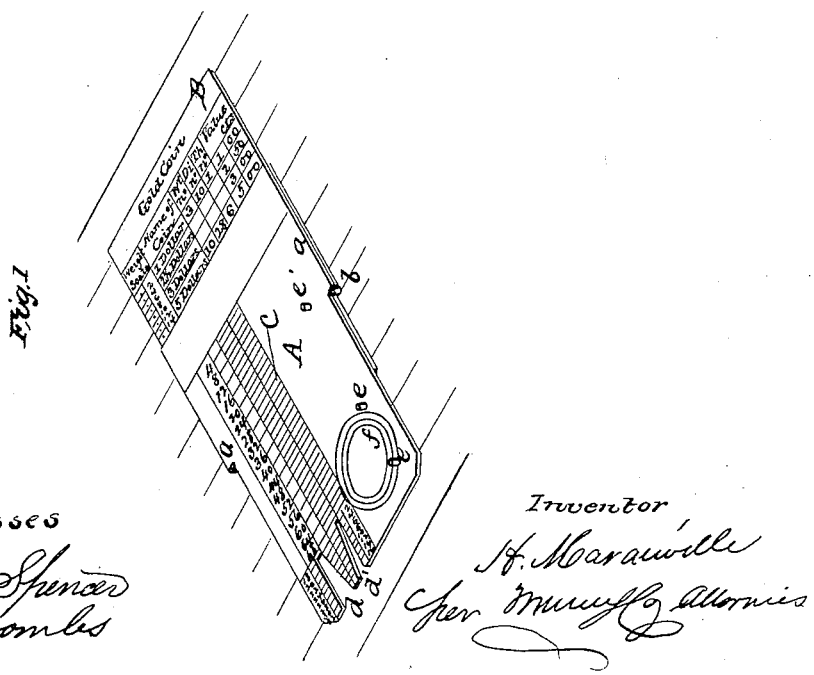

UNITED STATES PATENT OFFICE.

H. MARANVILLE, OF CLINTON, OHIO.

COIN-DETECTOR.

Specification of Letters Patent No. 27,140, dated February 14, 1860.

*To all whom it may concern:*

Be it known that I, H. MARANVILLE, of Clinton, in the county of Summit and State of Ohio, have invented a new and Improved Coin-Detector; and I do hereby declare that the following is a full, clear, and exact description of the same, reference being had to the accompanying drawing, forming a part of this specification, in which—

Figure 1, represents a perspective view of my invention, arranged for testing gold coin. Fig. 2, is a plan or top view of the same, arranged for testing silver coin. Fig. 3 is a longitudinal vertical section of the same.

Similar letters of reference in the three views indicate corresponding parts.

This instrument is designed for testing the weight and the dimensions viz: diameter and thickness, of gold and silver coin, and my invention consists in combining a slide marked with suitable scales with a plate which is furnished with two knife edges on its under side and with two projections above in such a manner that the standard weight of a certain coin placed against the two projections on the upper side of the plate turns the same on the above named edges, and raises the slide, when the latter is drawn out to a certain point which is marked to correspond to the coin in question, said plate being also furnished with a scale to test the diameter, and with incisions or notches to test the thickness of various coins, the whole being so arranged as to make a new and improved article of manufacture.

To enable those skilled in the art to make and use my invention, I will proceed to describe its construction and operation.

A represents a plate of sheet-brass or any other suitable material, the edges $a$ of which are turned over for a little less than one half the length of the plate, so as to form guides for a slide B. Each of the edges $a$ is also turned down so as to form the two knife edges $b$ which are so situated that a line drawn through them, divides the plate in two unequal parts, leaving that part to which the guides $a$ are attached, the lightest. The upper surface of the plate A is marked with the diameter scale $c$ which is obtained by dividing two inches into 64 parts or degrees, $\frac{1}{32}$ of an inch each and numbered from the inner end of the scale toward the outer edge of the plate.

On the outer end of the plate A are two incisions $d$, $d'$, one half inch deep, each, to form the scale of thickness. These incisions are tapering, and they are so formed that the inner end of the largest incision $d$ is equal in width to the outer end of the smallest incision $d'$, both together in fact forming one continuous incision of one inch in depth. The large end of the incision $d$ is $\frac{19}{110}$ or $\frac{38}{220}$ of an inch wide, and the small end of the incision $d'$, is $\frac{1}{220}$ of an inch in width. The whole space from the small end of the incision $d'$, to the large end of the incision $d$, is divided into 32 parts, marked with figures from 1 to 32. No. 1, is $\frac{1}{220}$ in width, leaving $\frac{31}{220}$ to be divided into 31 parts of $\frac{1}{220}$ of an inch each, as clearly shown in Figs. 1, and 2, thus making one degree in diameter scale $6\frac{7}{8}$ times as large as one degree in thickness scale. Two studs or pins $e$ are secured in the top surface of the plate A, and a circle or a series of concentric circle $f$, indicate the place which the coin has to occupy in order to test its weight as will be hereinafter more fully explained. An extra pin $e'$ is inserted into the plate at a greater distance from its outer edge for the purpose of testing slug, or any other coin too heavy to be tested between the studs $e$.

The slide B which moves quite easy between the guides $a$, is marked on both sides with different scales. One side is intended for gold and the other for silver coin, and each side is divided lengthwise into 7 columns. The first column is for the weight scale and it is marked "Wt. scale" over head and numbered from the head downward, 2, 4, 6, 8 etc. The second column is for the names of coin, and it is marked accordingly, over head. The third column is for the numbers of the first column, corresponding to the weight of the different coins, the names of which are marked in the second column, and it is marked Wt. No. (weight number) over head. The fourth column is for the numbers of the diameters as taken from the scale $c$ or the plate A, and it is marked "Di. No." overhead. The fifth column is for the thickness numbers, taken from the numbers on the sides of the incisions $d$ $d'$, to correspond to the thickness of the different coins, and it is marked Th. No. over head. The sixth and seventh columns are for giving the value of each coin in dollars and cents, and they are marked $ and cts. over head. By having one genuine coin of each kind, the different columns can easily be filled out, and the size of the instrument is such that it gives room for all the known coins of the civilized world.

The manipulations necessary to test a certain coin by my instrument will be best understood by one or two examples. The first and most necessary thing, especially in testing silver coin, is to try the sound or "jingle" of the coin, for there, are some spurious coins purporting to be silver which are composed mostly of lead or other base metal, the specific gravity of which is nearly the same as silver. If the "jingle" is bad, the coin need not be tested any further; it is spurious; but any of the metals generally used to give the coin "jingle" will be detected by the instrument, as all those metals are lighter than silver. But to proceed further, if a quarter dollar is to be tested, and its "jingle" is found to be good, its weight is first tested. That side of the slide B, marked "Silver coin" is turned up and the slide is pulled out until the weight number (12) found on the third column and opposite to the name of the coin (quarter dollar) comes exactly in line with the inner edge of the plate A. The coin is now placed on the plate, so as to touch both the studs e, as shown in red outlines in Fig. 2, and if the weight of the coin is correct, it will gently raise the slide B, turning the outer edge of the plate down. This will not be the case, if the coin is spurious and too light. If the weight of the coin is found to be correct, its diameter is tested by placing it on the plate A, so that its edge is precisely on the line drawn across said plate near to its inner end. The opposite edge of the quarter dollar, if the coin is good, will correspond with the mark 30, on the scale C. In the same manner the thickness of the coin is tested by placing it edgewise into the incision $d'$, and if the coin is good, it will enter this incision exactly to the mark 6, on its side. One more example will be sufficient to make the use of my instrument clear to everybody. Suppose a 5 dollar gold piece is to be tested, and the slide is turned over so as to bring that side marked "gold coin" on the top. The weight of the coin is now tested in the same manner as above described, and if the slide is drawn out to the number 16, on the weight scale, and the 5 dollar piece is placed, against the studs e it will gently raise the slide, if its weight is correct. The diameter of the coin and its thickness is now tested in the same manner as above described, and if the coin is good the diameter will be found to be 28, and its thickness 6 as marked in the corresponding columns on the slide.

It must be remarked that the thickness and the diameter of the same coins varies to some extent. My instrument is marked according to the latest standard coins of the various denominations, and at the same time the diameter scale is in such relation to the thickness scale, that one degree more on the one gives one degree less on the other, in order to retain the same weight so that my instrument can be used also for coins which vary from those coins which served in marking the instrument.

What I claim as new, and desire to secure by Letters Patent, as a new article of manufacture, is,

The arrangement of the plate A with the diameter scale c, and incisions d, $d'$, and with knife edges b, in combination with the slide B, marked on one side for gold, and on the other side for silver coins, as herein described, and operating in the manner and for the purpose specified.

H. MARANVILLE.

Witnesses:
 CHAS. RINEHART,
 W. M. HEFFELMAN.